US012518720B2

(12) United States Patent
Wang et al.

(10) Patent No.: US 12,518,720 B2
(45) Date of Patent: Jan. 6, 2026

(54) ELECTRONIC CONTROL OF SMART GLASSES FOR ENHANCED REALITY APPLICATIONS

(71) Applicant: Meta Platforms Technologies, LLC, Menlo Park, CA (US)

(72) Inventors: Nan Wang, Sunnyvale, CA (US); Johana Gabriela Coyoc Escudero, Union City, CA (US); Julian Joseph Maurice Fessard, Mountain View, CA (US); Cory Angelo Harris, Oakland, CA (US); Melinda Dora Szabo, Stanford, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 630 days.

(21) Appl. No.: 17/891,875

(22) Filed: Aug. 19, 2022

(65) Prior Publication Data
US 2023/0066327 A1 Mar. 2, 2023

Related U.S. Application Data

(60) Provisional application No. 63/278,876, filed on Nov. 12, 2021, provisional application No. 63/237,921, filed on Aug. 27, 2021.

(51) Int. Cl.
*G09G 5/10* (2006.01)
*G02B 27/01* (2006.01)

(52) U.S. Cl.
CPC ........ *G09G 5/10* (2013.01); *G02B 2027/0178* (2013.01); *G09G 2360/144* (2013.01)

(58) Field of Classification Search
CPC .............. G09G 5/10; G09G 2360/144; G09G 2380/10; G02B 2027/0178; G02B 2027/0118; G02B 27/0172; G06F 3/147
See application file for complete search history.

(56) References Cited

U.S. PATENT DOCUMENTS

| | | | |
|---|---|---|---|
| 2016/0178905 A1* | 6/2016 | Rider | G06F 3/0489 345/8 |
| 2020/0111258 A1* | 4/2020 | Sears | G06T 19/006 |
| 2020/0251070 A1* | 8/2020 | Park | G02B 27/01 |

FOREIGN PATENT DOCUMENTS

| | | |
|---|---|---|
| CN | 106444079 A | 2/2017 |
| WO | WO2019123975 A1 * | 11/2018 |

OTHER PUBLICATIONS

EPO—International Search report and Written Opinion for International Application No. PCT/US2022/041678, mailed Dec. 5, 2022, 9 pages.

* cited by examiner

*Primary Examiner* — Brent D Castiaux
(74) *Attorney, Agent, or Firm* — Morgan, Lewis & Bockius LLP

(57) ABSTRACT

A method for controlling the transparency level in smart glass is provided. The method includes receiving a signal indicative of an ambient light intensity from a sensor in a smart glass, selecting a transparency level for an eyepiece in the smart glass based on the signal, and providing the transparency level to a control circuit so that the eyepiece can receive a desired current to activate a dimming device in the eyepiece to a desired level.

18 Claims, 14 Drawing Sheets

ELECTRONIC CONTROL OF SMART GLASSES FOR ENHANCED REALITY APPLICATIONS

CROSS-REFERENCE TO RELATED APPLICATIONS

The present disclosure is related and claims priority under 35 USC 119(e) to U.S. provisional patent applications 63/237,921 entitled ELECTRONIC CONTROL OF SMART GLASSES FOR ENHANCED REALITY APPLICATIONS, filed on Aug. 27, 2021, and 63/278,876, entitled ELECTRONIC CONTROL OF SMART GLASSES FOR ENHANCED REALITY APPLICATIONS, filed on Nov. 12, 2021, both to Nan Wang, et al., the contents of which are hereby incorporated by reference in their entirety, for all purposes.

BACKGROUND

Field

The present disclosure is related generally to a user interface for headsets and wearable devices. More specifically, the present disclosure is related to the electronic control of tint and shading in smart glasses via a user interface or automated commands.

Related Art

Wearable devices have simple user interfaces so that users can easily provide commands and adjust settings on the go. However, when the wearable devices are headsets or smart glasses, the constraints are even higher, as it is desirable that the user maintains a hands-free approach while assessing a scene developing before her/his eyes. Currently, user interfaces and electronic control of different settings in headsets and smart glasses involves a user touch or action that binds the user hands. Moreover, voice control systems have not reached the level of precision desirable for handling complex configurations. Artificial intelligence approaches up to date lack the precision and granularity to provide a satisfactory response based on user gestures and other touch-free actions.

Figure 1:
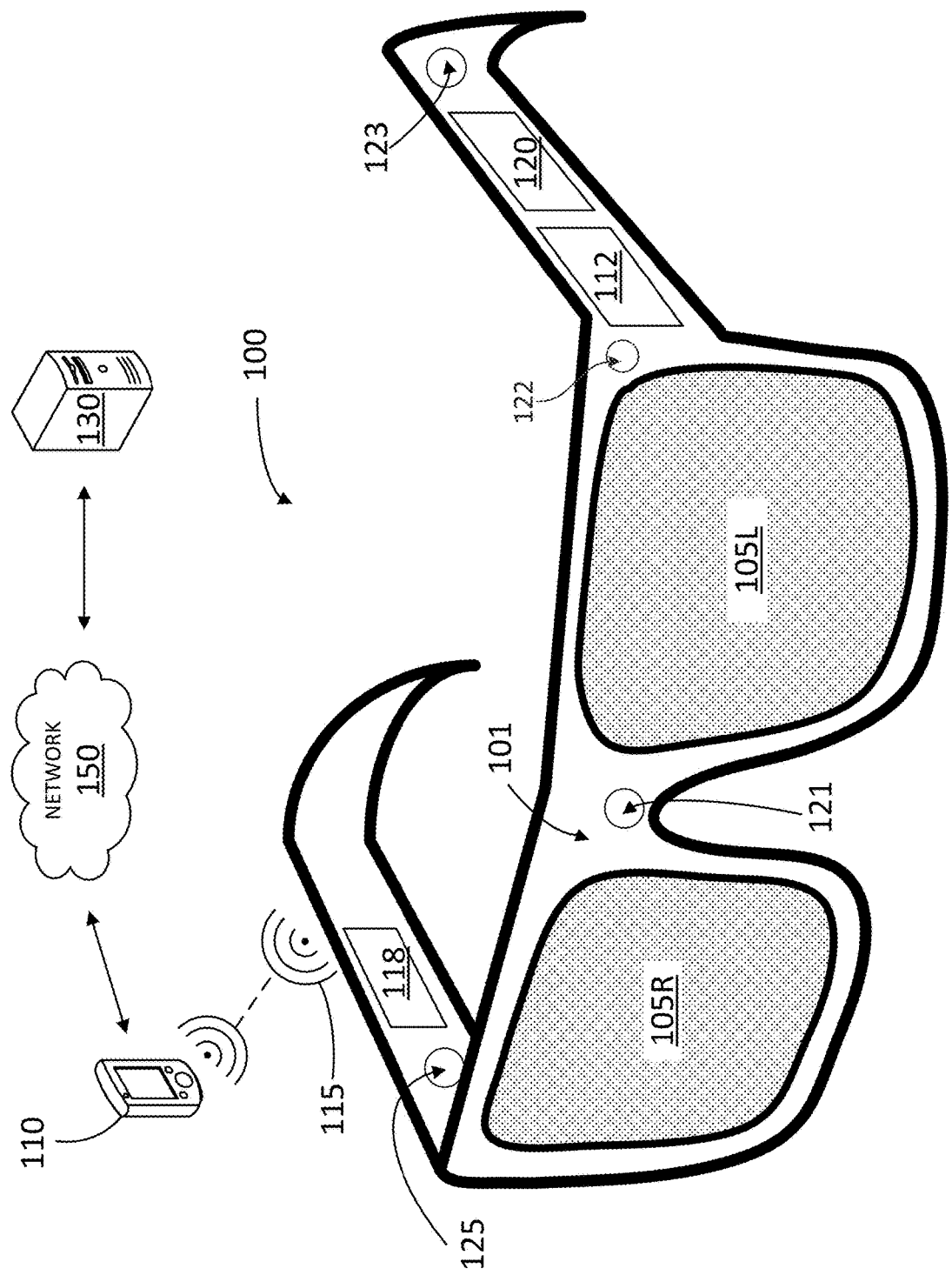
FIG. 1 illustrates a smart glass for enhanced reality applications, according to some embodiments.

In the figures, elements having the same or similar label share the same or similar features, unless expressly stated otherwise.

SUMMARY

A computer-implemented method includes receiving a signal indicative of an ambient light intensity from a sensor in a smart glass. The computer-implemented method also includes selecting a transparency level for an eyepiece in the smart glass based on the signal, and providing the transparency level to a control circuit so that the eyepiece can receive a desired current to activate a dimming device in the eyepiece to a desired level.

A system includes a memory storing instructions, and one or more processors configured to execute the instructions and cause the system to perform operations. The operations include to receive a signal indicative of an ambient light intensity from a sensor in a smart glass, to select a transparency level for an eyepiece in the smart glass based on the signal, and to provide the transparency level to a control circuit so that the eyepiece can receive a desired current to activate a dimming device in the eyepiece to a desired level. The operations also include to receive a signal from a face detection system, the signal indicative that a user is wearing the smart glass, and booting the smart glass in response to the signal from the face detection system.

A computer-implemented method includes selecting a software input or a hardware input to control a transparency level in a smart glass, and receiving, from a touch sensor in the smart glass or from a command input through a graphical user interface in a mobile device coupled with the smart glass, a desired transparency level for the smart glass. The computer-implemented method also includes providing to a dimming device in an eyepiece of the smart glass, through a controller circuit, a current sufficient to obtain the desired transparency level.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

In the field of wearable devices, electrical interconnects for smart glasses present a challenge due to the delicate parts involved and the stressful environmental conditions under which the devices are expected to operate seamlessly. For example, it is expected that electrical interconnects are pliable to user's needs and desires via simple gestures, touches, and voice commands or instructions. One of the important tasks for electric control of smart glasses is the transparency level of the eyepieces therein. The transparency level is a primary setting to enhance user comfort and safety. In addition, for the implementation of augmented reality configurations, it is important to accurately set the background of the display with attention to comfort, safety, and effectiveness. Another challenge for smart glasses is to reduce power consumption, as the autonomy of the devices is paramount for comfort and user preference. Accordingly, it is desirable to have smart glasses with simple and compact interconnects that have a seamless assembly process that allows reconfiguration of transparency levels according to usage and environment.

To address the above challenges, in some embodiments, multiple sensors in the smart glass provide inputs to a microcontroller configured to enable frictionless transparency control of smart glasses. In addition, some embodiments offer smart glass customization of transparency levels according to pre-defined ambient light intensity. In some embodiments, machine learning algorithms are used to capture user preferences input via manual adjustment by the user. In addition, some embodiments include low power use strategies and sleep mode management in a reserve mode of operation, to extend the autonomy and range of the smart glasses beyond what is currently possible.

FIG. 1 illustrates a smart glass 100 for enhanced reality applications, according to some embodiments. Smart glass 100 includes a frame 101, holding left (105L) and right (105R) eyepieces (hereinafter, collectively referred to as "eyepieces 105"), a processor 112, a memory 120, and a communications module 118. Memory circuit 120 stores instructions, which when executed by processor 112, cause smart glass 100 to perform at least some of the steps and operations disclosed herein. Communications module 118 generates electromagnetic (EM) signals to communicate with a mobile device 110 (e.g., a smart phone with the user of smart glass 100). Mobile device 110 may in turn communicate with a remote server 130 via a network 150. Remote server 130 may host an application installed in mobile device 110, through which the user may control, adjust settings, provide, collect, and process data collected by smart glass 110. Accordingly, communications module 118 may include radio and antenna hardware and software, to provide and receive wireless signals from mobile device 110 and/or the remote server 130.

In some embodiments, eyepieces 105 may include active components such as liquid crystal layers configured to provide a variable tint or dimming of eyepieces 105. Thus, the transparency of smart glass 100 may be adjusted either automatically or by user control according to environmental conditions or user desire. To assess the environmental conditions, smart glass 100 may include one or more sensors 121 that may be configured as ambient light sensors (ALS), acoustic detectors, and the like. Ambient light sensors 121 may be configured to detect visible light (VIS, 450 nm-750 nm), ultraviolet light (UV, 200 nm to 450 nm wavelength), infra-red light (IR, 750 nm to 10 μm wavelength), or any other desired wavelength range. For example, in some embodiments, a UV detector may indicate the presence of direct sunlight (e.g., the user is outdoors and/or in a bright sunny day).

In addition, and as part of a user interaction system, smart glass 100 may include a speaker/microphone 125 so that the user may provide voice commands and receive audio feedback. In some embodiments, the user interface may include touch-sensitive controllers and sensors 123. In some embodiments, input from the touch sensors 123 may be used in machine learning algorithms for gesture recognition. Sensors 123 in smart glass 100 may also include face detecting sensors, and inertial measurement units (IMUs) such as accelerometers and gyroscopes, to help determine whether smart glass 100 is being used, or it lays idle.

In some embodiments, memory 120 storing instructions and a processor configured to execute the instructions to perform at least one or more steps in methods as disclosed herein. For example, the instructions stored in the memory may be part of an application installed in the mobile device and hosted by the remote server. The application may be configured to pair up the mobile device with the smart glass, retrieve data from it, and provide instructions and updates to the smart glass. For example, the mobile application may include a user assistant to control and adjust settings in the smart glass, and even to provide instructions and set configuration modes of the smart glass. Additionally, a camera 122 installed in the glass frame may capture an image or video of the forward view of the user. The image or video may be used by the processor or an application in the mobile device to review, inspect and analyze the user's environment and arrive at a decision as to steps to take based on the environment. Further, in some embodiments the camera may capture a hand gesture made by the user as part of an interface to instruct the smart glass to take certain action.

Figure 2:
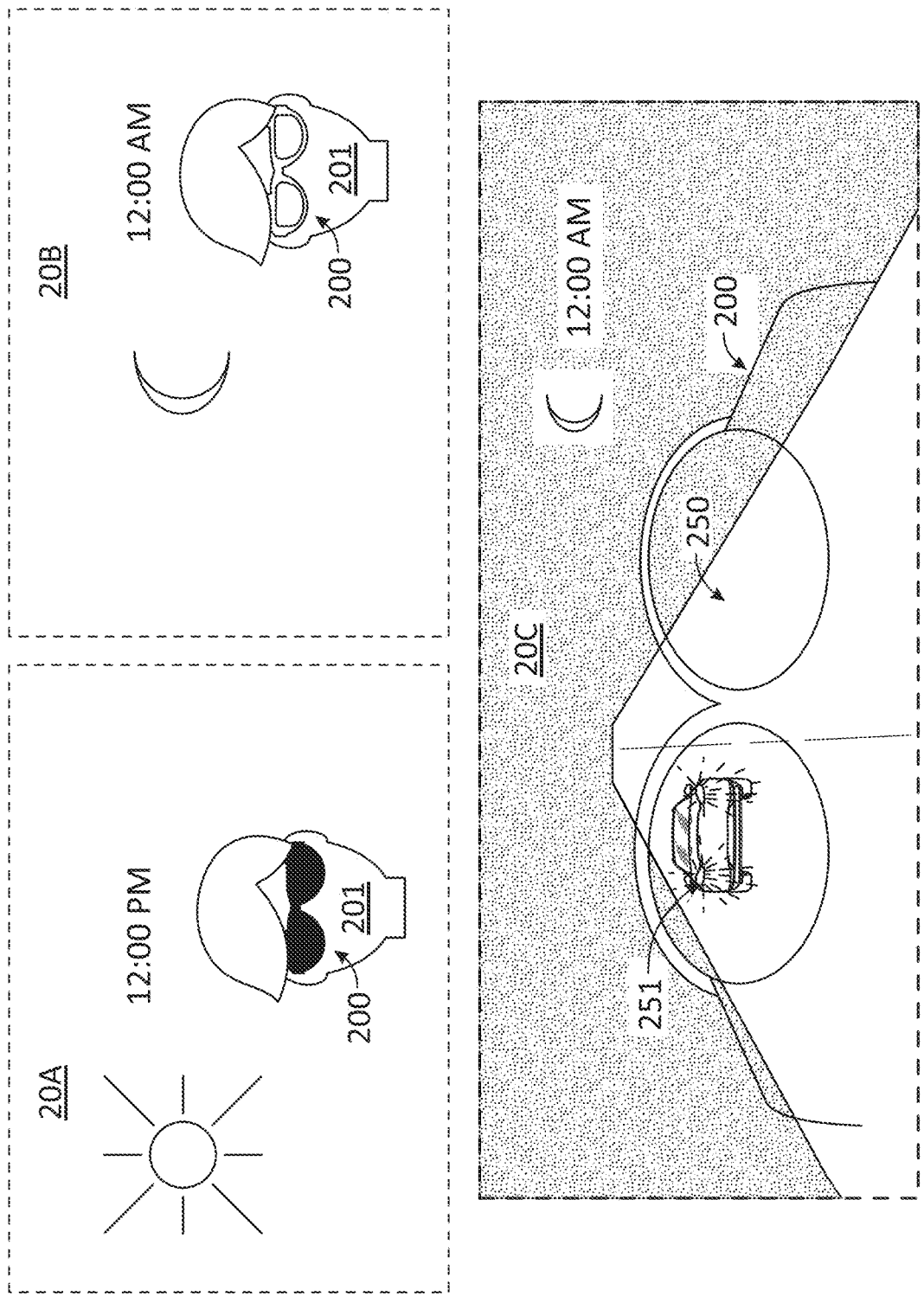
FIG. 2 illustrates several configurations of a smart glass with an electronic control for transparency regulation, according to some embodiments.

FIG. 2 illustrates several configurations 20A, 20B, and 20C (hereinafter, collectively referred to as "configurations 20") of a smart glass 200 with an electronic control for transparency regulation, according to some embodiments. In configuration 20A, a user 201 is in a bright outdoors (e.g., 12:00 PM) and the transparency of the eyepieces in smart glass 200 is toned down. In configuration 20B, user 201 is outdoors, at night (e.g., 12:00 AM) in a poorly lit environment. Accordingly, in configuration 20B, it is desirable that the transparency of smart glass 200 be higher. To achieve any of the outcomes in configurations 20A or 20B, smart glass 200 may include ambient light sensors (e.g., sensors 121) to assess the level of environmental lighting available.

Configuration 20C is somewhat more complex. User 201 is driving at night, with low environmental lighting. However, a car heads on to the user with the headlights 251 'on'. Accordingly, the desirable outcome is that smart glass 200 keep the transparency level unchanged (or at least to not reduce transparency) so that the user can see the road 250 with the oncoming traffic and other hazards. To achieve this, the electric control of smart glass 200 may apply artificial intelligence algorithms, in addition to ambient light sensors, to correctly read the situation and apply the appropriate action.

More generally, embodiments as disclosed herein include any one of configurations 20, complemented with IMU sensor data and touch sensing data to interpret the specific circumstances that user 201 is in, and to better and more safely assess user's needs and desires (e.g., user 201 is driving at night, taking an outdoors walk through a dark area, e.g., a forest, cloudy or stormy sky, and the like). Additionally, a mobile device (e.g., mobile device 110) communicatively coupled with the smart glass may identify, via GPS and other geolocation strategies, the time of day and the position of the sun relative to the user's head and orientation (which may be retrieved via IMU sensors). Accordingly, machine learning algorithms as disclosed herein may use geolocation information and the head orientation of the user therein to assess the use configuration of smart glass 200 and better provide transparency level adjustment thereof.

Figure 3:
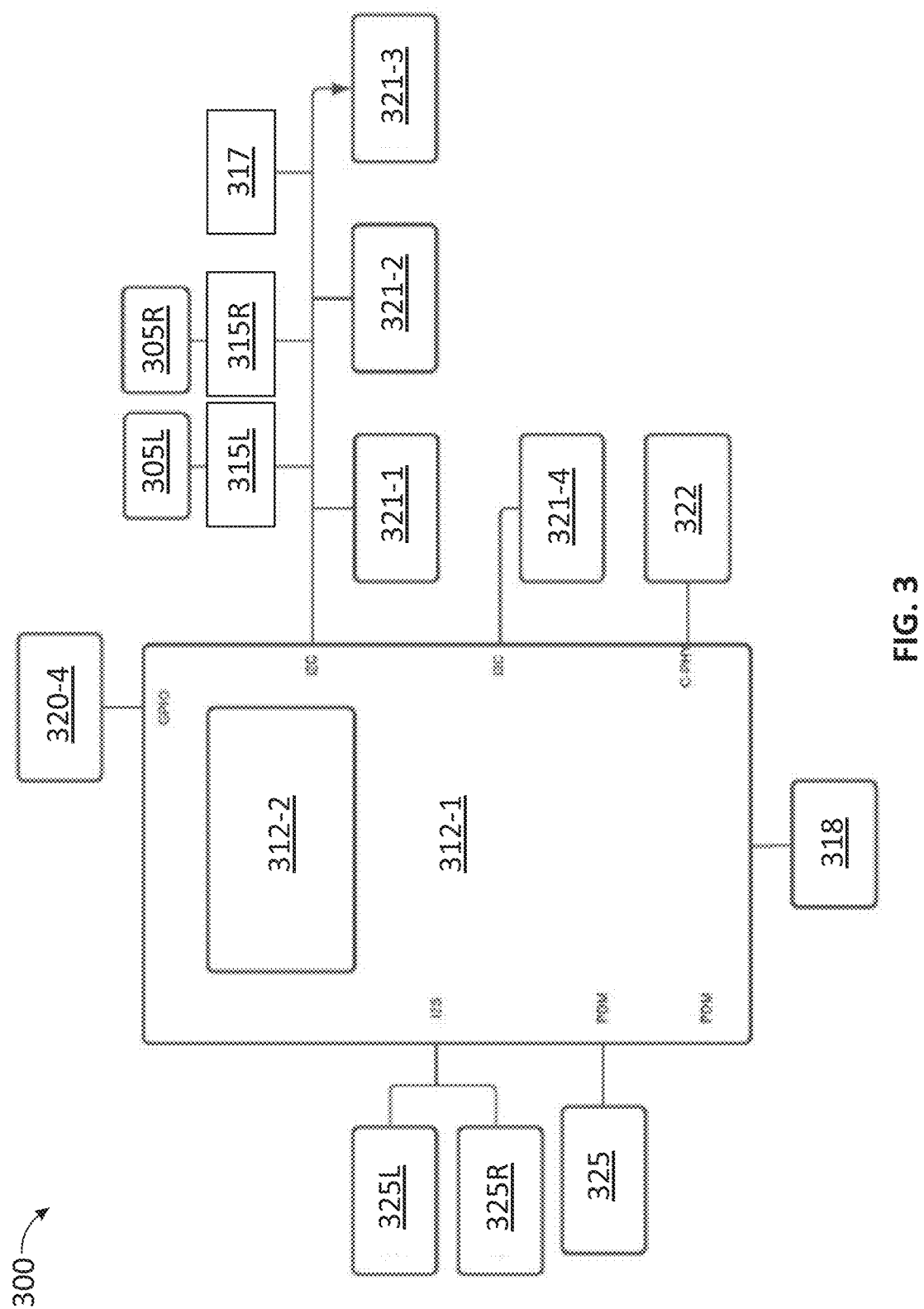
FIG. 3 illustrates a block diagram of a circuit for electronic control of a transparency level in a smart glass, according to some embodiments.

FIG. 3 illustrates a block diagram 300 of circuits 312-1 and 312-2 (hereinafter, collectively referred to as "circuits 312") for electronic control of a transparency level in a smart glass, according to some embodiments. Circuit 312-1 may include a system on a chip (SoC), and circuit 312-2 may be a sensor microcontroller unit (MCU). Circuit 312-1 is coupled with a driver 315L for the left eyepiece 305L, and a driver 315R for the right eyepiece 305R (hereinafter, collectively referred to as "eyepiece drivers 315" and "eyepieces 305"), and a face detection sensor 317. Eyepiece drivers 315 control the transparency levels of the respective eyepieces 305, separately. In some embodiments, eyepiece drivers 315 may be combined in a single unit that controls eyepieces 305 together (e.g., simultaneously). Circuit 312-1 may also be coupled to an ALS 321-1, a touch sensor 321-2, and a light emitting diode (LED) driver 321-3, an IMU sensor 321-4, and a camera 322. Other accessories and devices coupled to circuit 312 may include speakers 325L and 325R (hereinafter, collectively referred to as "speakers 325"), a digital microphone (DMIC) 325, and a communications module 318 (e.g., 8T/LAN).

In some embodiments, circuit 312-1 may operate one or more algorithms to perform at least some, or all, of the operations as disclosed herein, including machine learning algorithms, neural networks and natural language processing (NLP) algorithms.

Figure 4A:
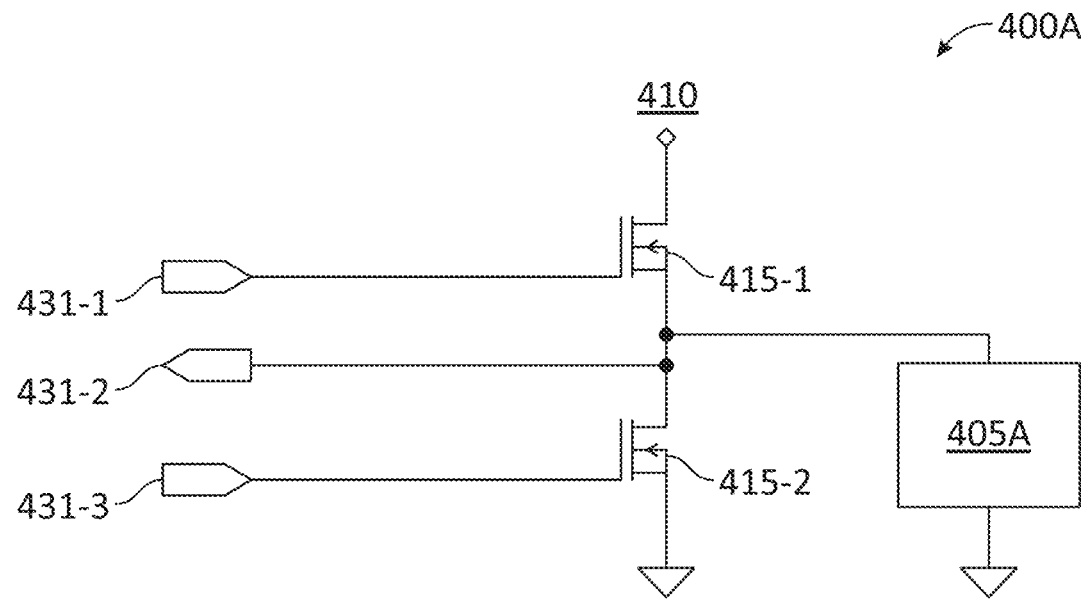
FIGS. 4A-4C illustrate circuit diagrams and signals for a shared control of a transparency level in a left eyepiece and a right eyepiece in a smart glass, according to some embodiments.

FIG. 4AC illustrate circuit diagrams and signals 433-1 and 433-2 (hereinafter, collectively referred to as "signals 433") for a shared control of a transparency level in the eyepieces 405A and 405B (hereinafter, collectively referred to as "eyepieces 405") in a smart glass, according to some embodiments. In the diagram, two configurations are illustrated. Connectors 431-1, 431-2 and 431-3 (hereinafter, collectively referred to as "connectors 431") provide voltage to charge, to eyepieces 405 and to discharge, respectively, the smart glass.

FIG. 4A illustrates a first configuration 400A with two MOSFETs 415-1 and 415-2 (PN configuration, hereinafter, collectively referred hereinafter to as "MOSFETs 415" feeds the active components of eyepieces 405 from a drain-source 410 coupling of MOSFETs 415. One of eyepieces 405, having a fixed charge level, has a negative port coupled to ground. Accordingly, when the charge in eyepiece 405A drops below a set threshold voltage within a pre-selected period of time, eyepiece 405A is charged.

Figure 4B:
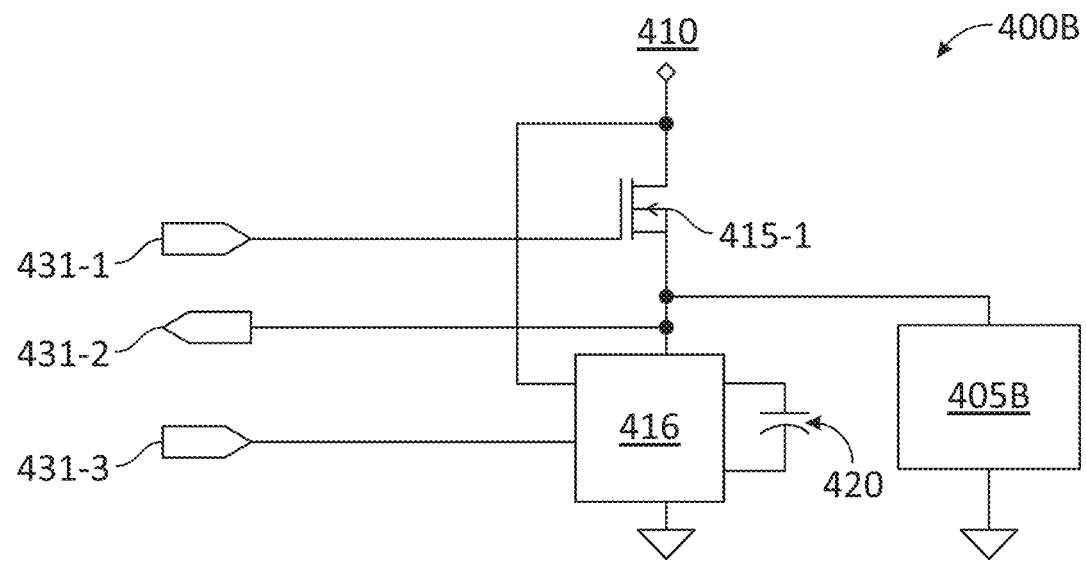

FIG. 4B illustrates a second configuration 400B including MOSFET 415-1 (P channel) that feeds into an integrated circuit 416. The active components in eyepiece 405B are fed through the drain of MOSFET 415-1.

Figure 4C:
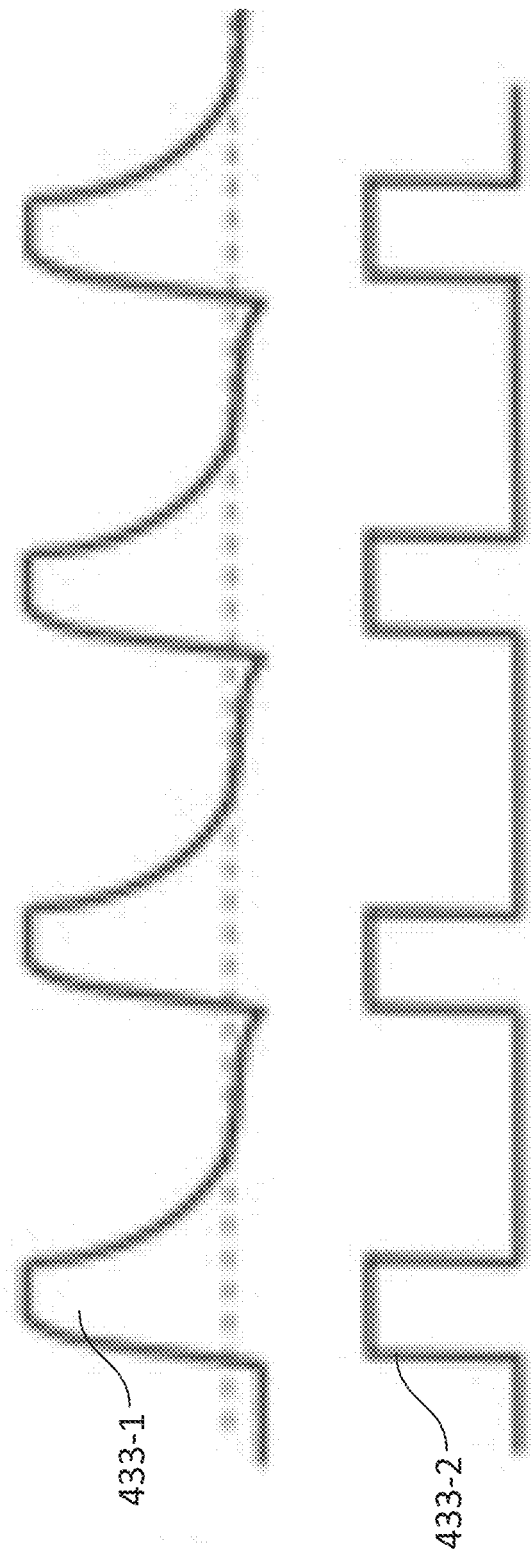

FIG. 4C illustrates voltage signals 433 across the electrodes in the active elements of eyepieces 405, together with the charge level therein. The system controls one signal per eyepiece 405, thus adding a relatively low cost to the microcontroller configuration.

FIGS. 5 through 8 describe several embodiments of methods as disclosed herein wherein the sleep mode of operation to reduce power consumption is combined with three "wake" modes of operation: 'clear,' 'mid-scale,' and 'dark.' Accordingly, the smart glass settings may be arranged such that each of the clear, mid-scale, and dark levels have well defined transparency levels (e.g., clear, associated with 70% to 100% transparency, mid-scale mode associated with 30%-70% transparency, and dark mode associated with less than 30% transparency). The transparency levels for each operational mode may be set via threshold values set by default and adjusted via machine learning algorithms, as disclosed herein. Additionally, the threshold values and transparency levels as disclosed above may depend on the battery level or the measured charge in the battery, having a tendency to use less power as the battery is depleted. The transparency level may depend on the power used to dim the eyepieces in the smart glass. For example, in some embodiments, the no-power configuration may be associated with the highest transparency for the eyepieces, and in some embodiments the no-power configuration may be associated with the darkest configuration for the eyepieces. In general, it is understood that the wake modes of operation may be more than three, or less, depending on the user's desire, history of user usage, and the like.

Figure 5:
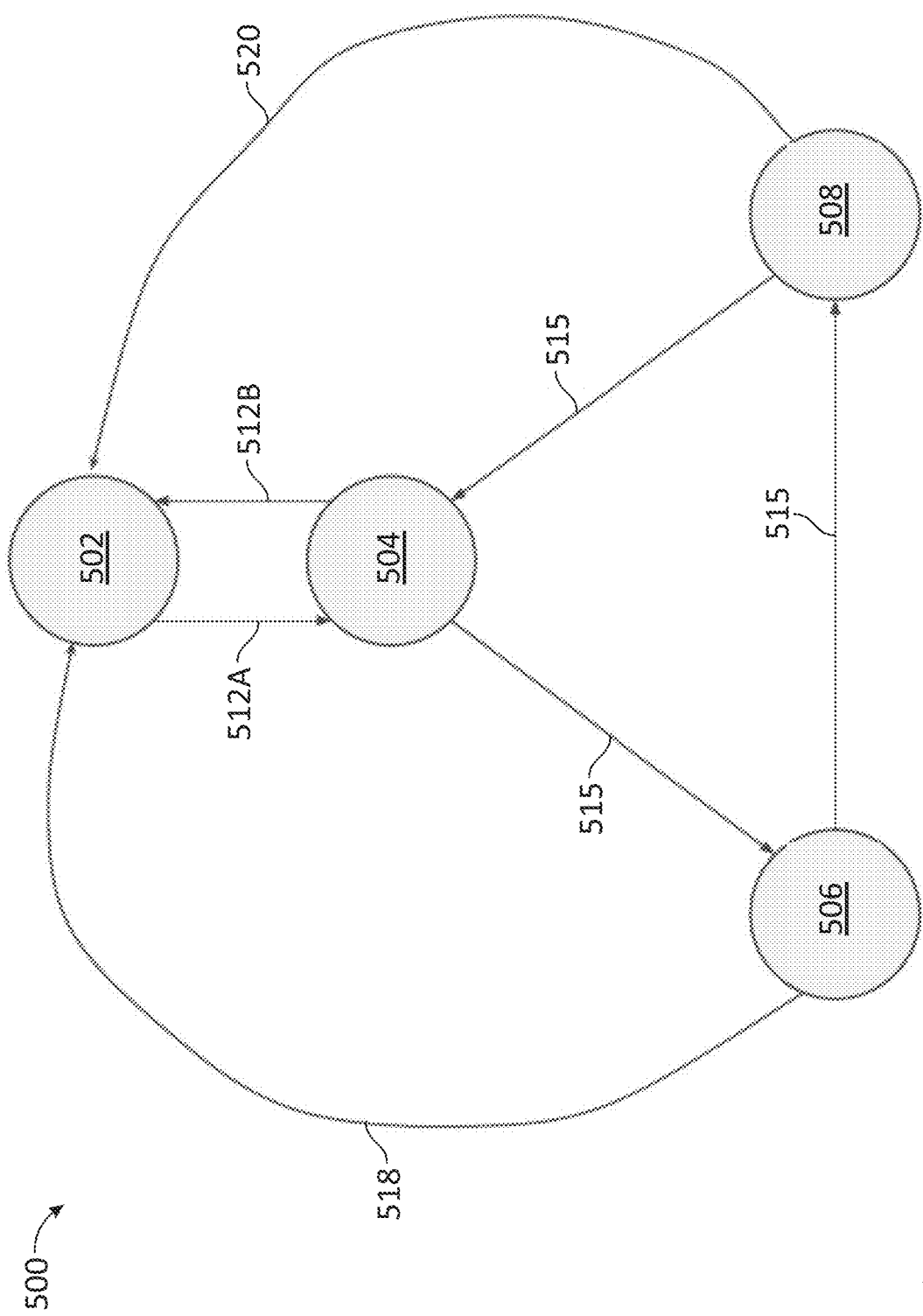
FIG. 5 illustrates a flow chart with steps in a cyclical manual control of a transparency level in a smart glass, according to some embodiments.

FIG. 5 illustrates a flow chart 500 with steps in a cyclical manual control of a transparency level in a smart glass (cf. smart glasses 100, 200), according to some embodiments. The device is, or enters, into a sleep mode 502 from a mid-scale transparency 506, a full dark view 508, or a clear mode 504. Upon a button activation from the user 515, the smart glass transitions from dark mode 508 to mid-scale mode 506. The same effect is obtained with button activation 515 from clear mode 504. Clear mode 504 is obtained from dark mode 508 upon button activation 515. Upon wakeup of the device 512A, a transition between system sleep mode 502 and clear mode 504 occurs. When the device is in clear mode 504, it will be set into system sleep mode 502 when a sleep mode is entered. Note that the transitions between dark mode 508, clear mode 504, and mid-scale mode 506 are cyclical, as in dark mode-clear mode, and mid-scale mode.

In some embodiments, the smart glass may enter sleep mode 502 by certain operations including, but not limited to: removing the smart glass from the head, wearing the device on the hairline, wearing the device upside down or on a cap, or closing the hinges of the smart glass.

Figure 6:
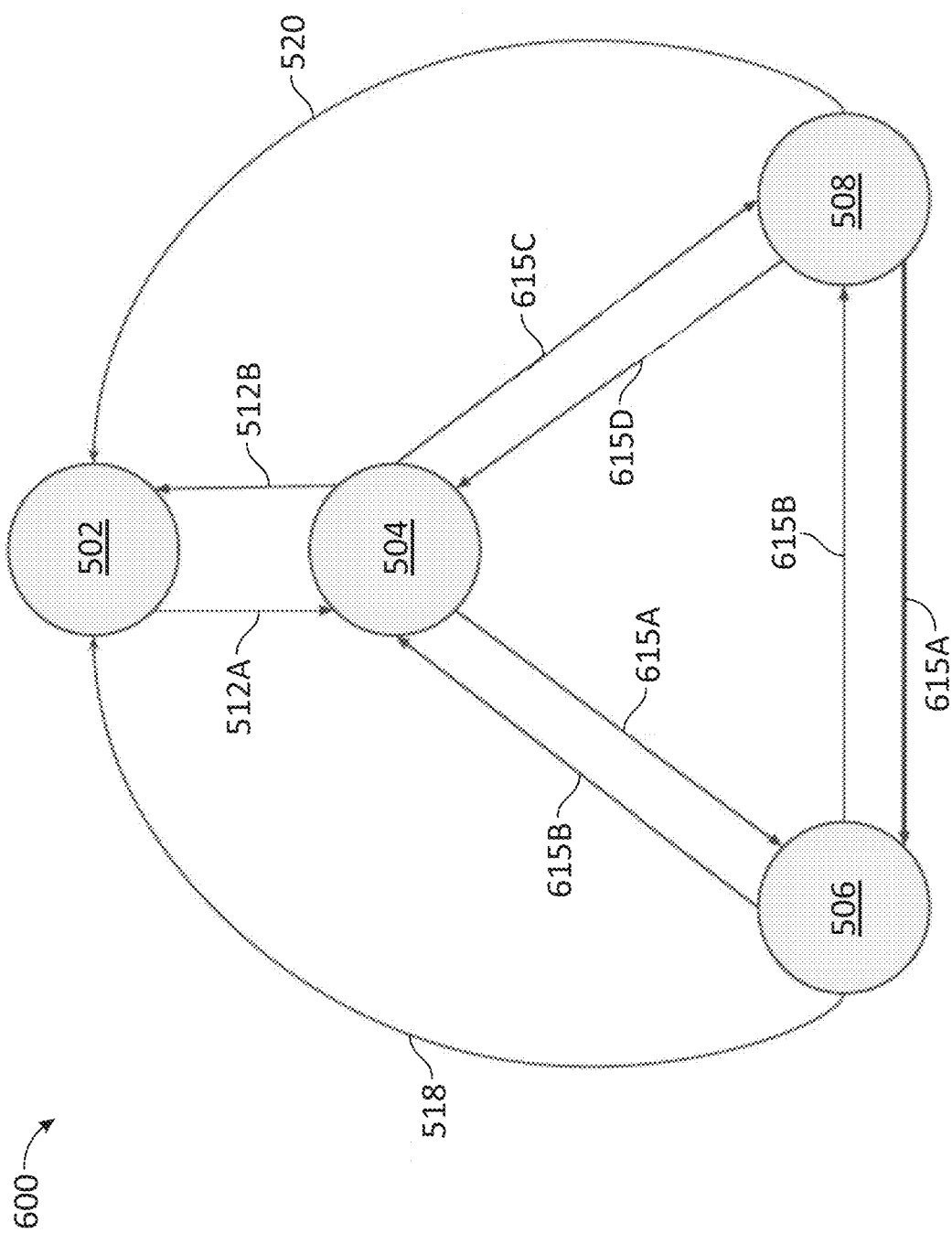
FIG. 6 illustrates a flow chart with steps in a two-way manual control of a transparency level in a smart glass, according to some embodiments.

FIG. 6 illustrates a flow chart 600 with steps in a two-way manual control of a transparency level in a smart glass (cf. smart glasses 100, 200), according to some embodiments. In this scenario, the transitions between any two of dark mode 508, clear mode 504, and mid-scale mode 506 are directly reversible. For example, to transition from clear mode 504 to mid-scale mode 506 may occur via a slow swipe forward or a double tap 615A. The reverse transition occurs with a slow swipe backward or a single tap 615B. The transition from clear mode 504 to dark mode 508 occurs with a fast swipe forward, or a double tap and hold 615C. The reverse transition occurs with a fast swipe backward and a single tap and hold 615D. Commands 615A, 615B, 615C and 615D will be hereinafter referred to as "gesture commands 615."

A transition from dark mode 508 to mid-scale mode 506 occurs via a slow swipe forward or a double tap 615A. The reverse transition occurs via a slow swipe backward and a single tap 615B. Note that, in this configuration, to transit between clear mode 504, dark mode 508, and mid-scale mode 506, any one of the three states may be the initial mode.

In some embodiments, the smart glass may enter sleep mode 502 by certain operations including, but not limited to: removing the smart glass from the head, wearing the device on the hairline, wearing the device upside down or on a cap, or closing the hinges of the smart glass.

Figure 7:
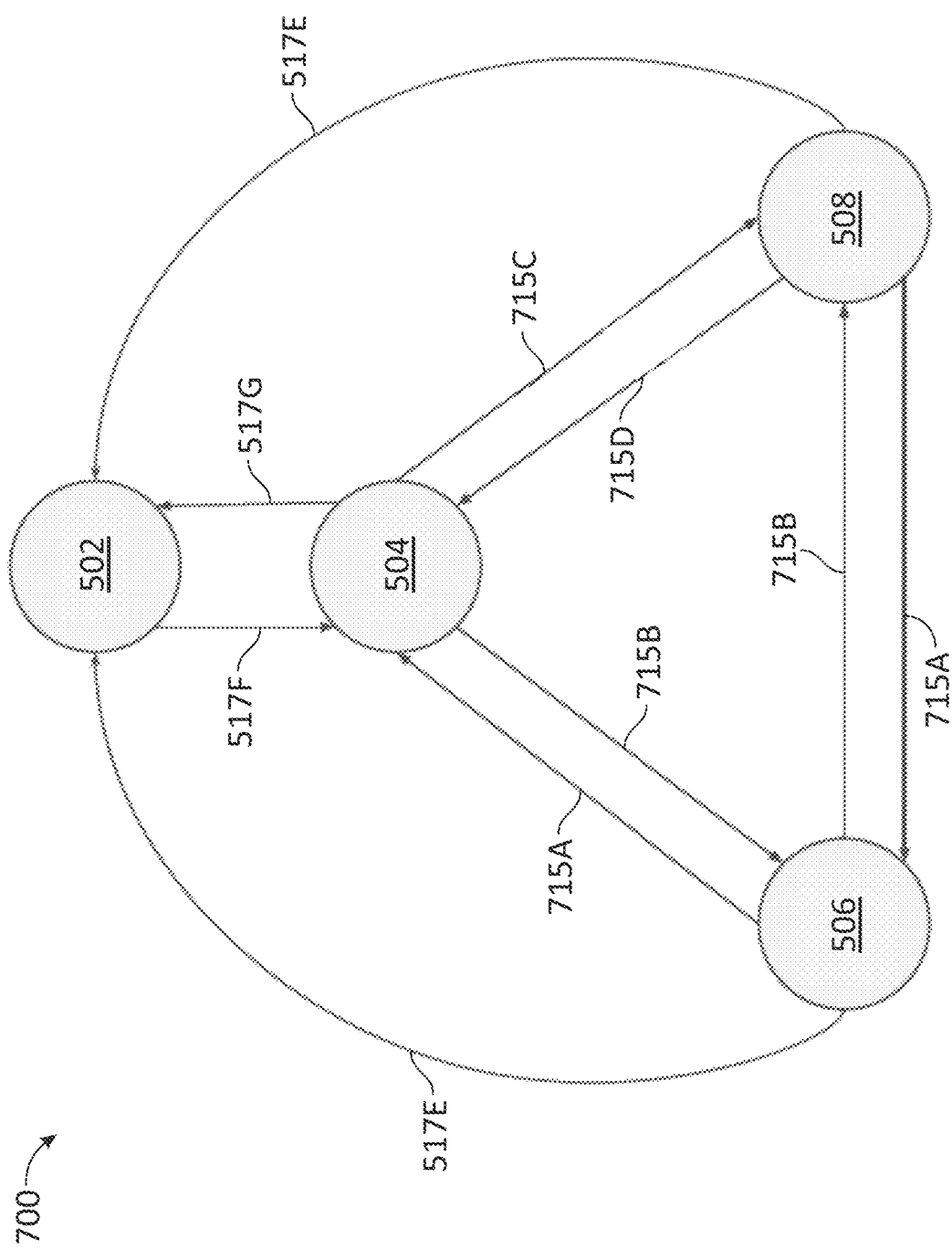
FIG. 7 illustrates a flow chart with steps in a two-way, voice control of a transparency level in a smart glass, according to some embodiments.

FIG. 7 illustrates a flow chart 700 with steps in a two-way, voice control of a transparency level in a smart glass, according to some embodiments. In this configuration, as in the previous one, transitions between any two of the clear (504), mid-scale (506), or dark (508) modes is directly reversible. In this configuration, the transitions are carried out through voice commands 715A, 715B, 715C and 715D (hereinafter, collectively referred to as "voice commands 715") from the user. In some embodiments, the voice command includes a keyword or phrase that the user says. For example, for transitions from mid-scale mode 506 to clear mode 504, voice command 715A may include the words "clearer." For the reverse transition, voice command 715B may include the word "darker." Likewise, for transitions from dark mode 508 to clear mode 504, voice command 715C may include the words "clearest." For the reverse transition, voice command 715D may include the word "darkest." And for transitions from dark mode 508 to mid-scale mode 506, voice command 715A may include the words "clearer." For the reverse transition, voice command 715A may include the word "darker."

Additionally, for a transition between either of mid-scale mode 506 or dark mode 508 to sleep mode 502, voice command 517E may include the phrase "enter sleep mode." For a transition out of sleep mode 502 into clear mode 504, voice command 517F may include the phrase "wake up" and the reverse transition may occur via the phrase "enter sleep mode" in voice command 517G.

In some embodiments, the voice commands include machine learning semantic interpretation of the voice command from the user. For example, in some embodiments, the system may use a machine learning algorithm having NLP neural networks configured to interpret the meaning of a sentence based on language classifiers. Accordingly, in some embodiments, the smart glass may be configured to operate in a specific language that the user may set at the start of a session.

In some embodiments, the smart glass may enter sleep mode 502 by certain operations including, but not limited to: removing the smart glass from the head, wearing the device on the hairline, wearing the device upside down or on a cap, or closing the hinges of the smart glass.

Figure 8:
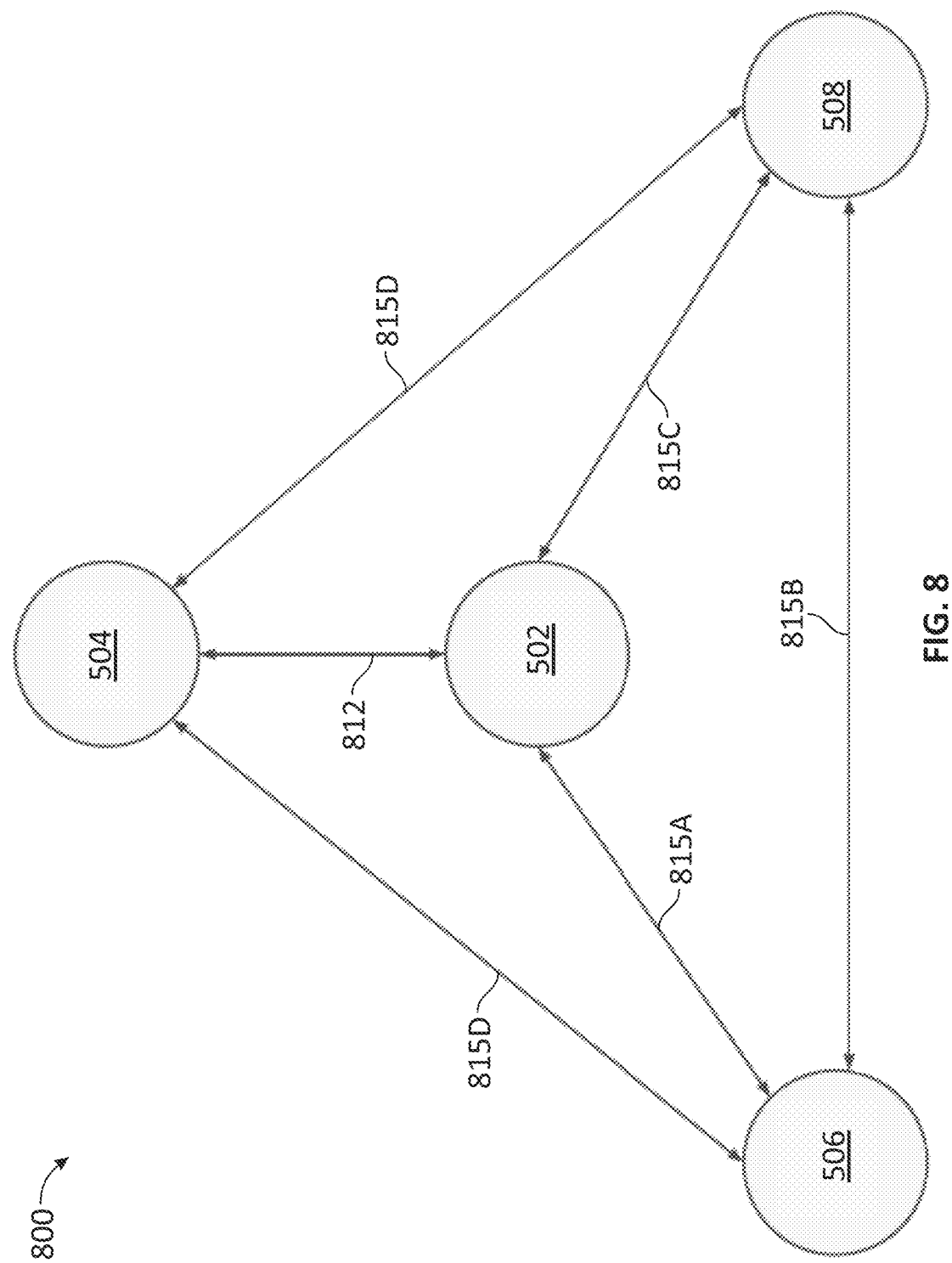
FIG. 8 illustrates a flow chart with steps in an automatic control of a transparency level in a smart glass, using ambient light sensors, according to some embodiments.

FIG. 8 illustrates a flow chart 800 with steps in an automatic control of a transparency level in a smart glass, using ALS (e.g., ALS 121), according to some embodiments. Accordingly, in some embodiments, the smart glass may include a first threshold level lower than a second threshold level for ambient light intensity. The first and second threshold levels may be automatically selected via machine learning algorithms, or may be manually set by the user.

When the smart glass is in clear mode 504 and the ALS detects a light level below the first threshold level after boot-up of the smart glass, the system is transferred into sleep mode 502 in step 812, after a boot up. Conversely, when the smart glass is in sleep mode 502 after boot up and the ALS detects a light level below the first threshold, the smart glass is awakened to clear mode 504 (step 812). When the smart glass is in sleep mode 502 after boot, and the ALS detects a light level higher than the second threshold level, the smart glass is awakened to dark mode 508 in step 815C. When the smart glass is in sleep mode 502 after boot, and the ALS detects a light level higher than the first threshold level but lower than the second threshold level, the smart glass is awakened to mid-scale mode 506 in step 815A.

When the smart glass is in clear mode 504 and the ALS detects ambient light above the first threshold level but below the second threshold level, the smart glass is set into mid-scale mode. 506 in step 815D. Conversely, when the smart glass is in mid-scale mode 506 and the ALS detects an ambient light less than the first threshold level or there is an ALS interrupt (e.g., prompted by the user), the smart glass is turned into a clear level (step 815D).

When the smart glass is in mid-scale mode 506 and the ALS is interrupted or it measures an ambient light greater than the second threshold level, the smart glass is turned into dark mode 502 (step 815A). Conversely, when the smart glass is in dark mode 502 and the ALS is interrupted or it measures an ambient light level greater than the first threshold level and lower than the second threshold level, the smart glass is set into mid-scale mode 506 (step 815A).

When the smart glass is in a dark mode and the ALS sensor detects a light intensity higher than the first threshold level but lower than the first threshold level, or the local time is past the sunset, the smart glass is set to clear mode 504.

Figure 9:
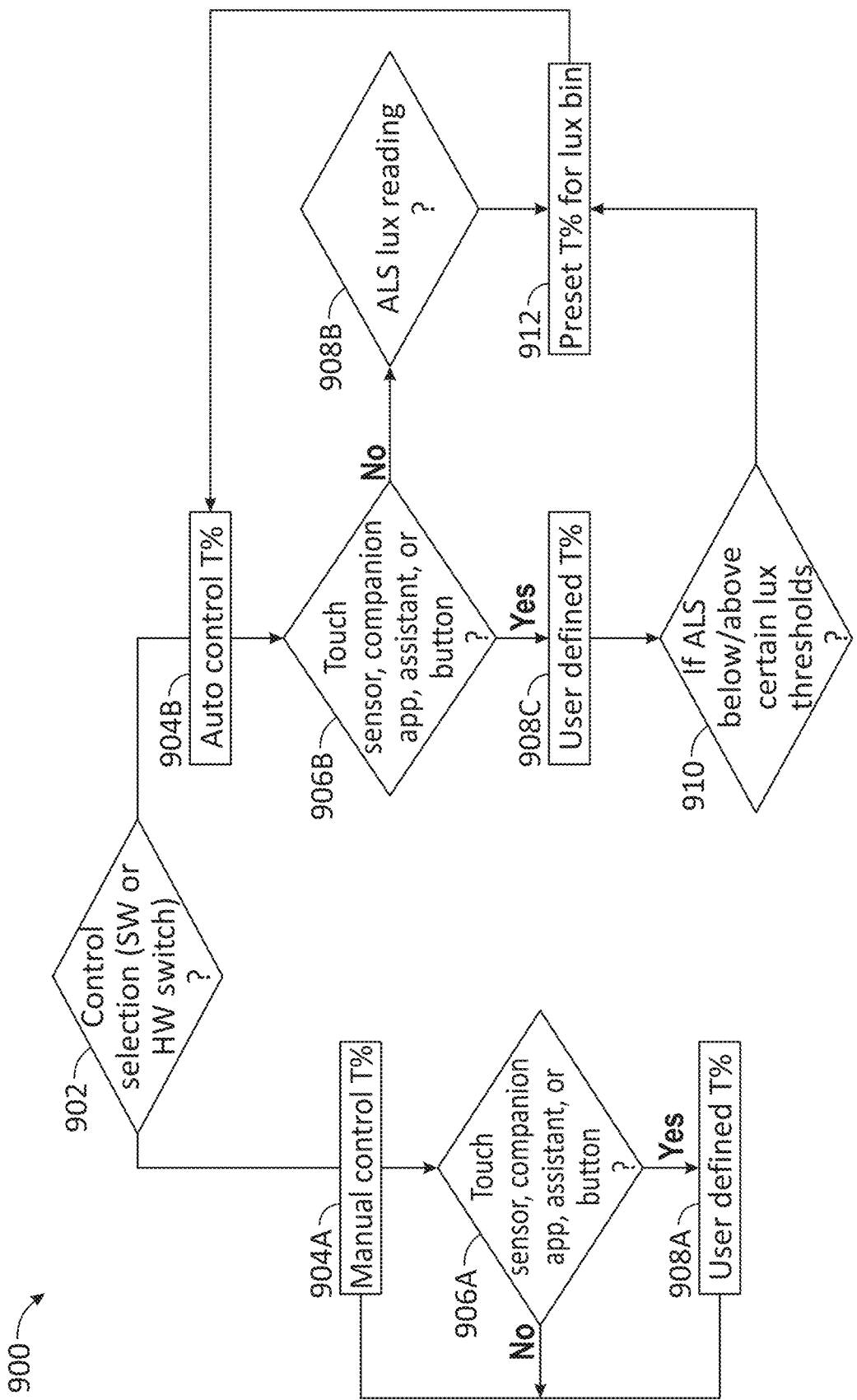
FIG. 9 illustrates a flow chart with steps for controlling a transparency level in a smart glass in a switching mode between automatic and manual control, according to some embodiments.

FIG. 9 illustrates a flow chart 900 with steps for controlling a transparency level in a smart glass in a switching mode between automatic and manual control, according to some embodiments.

A control selection step 902 selects a software (e.g., automatic) or a hardware (e.g., manual) control switch for the smart glass. When the manual control 904A or the auto control 904B are selected, the system queries a touch sensor (steps 906A and 906B), a mobile application, or device assistant (e.g., installed in the mobile device), or a button in the smart glass, to set a user defined transparency level in step 908A. In the auto control 904B, when there is no signal from the touch sensor, the mobile application, the assistant, or any other button, the system queries the ALS in step 908B, and sets the transparency level to the pre-selected value in step 912 (e.g., methods in FIGS. 5-8). Also in the auto control mode, even when the user defined transparency level is selected and applied (steps 908A and 908C), in some embodiments an ALS reading below or above the first or second threshold levels may trigger (step 910) a change in transparency level of the smart glass (step 912), according to any of the steps illustrated in FIGS. 5-8.

Figure 10:
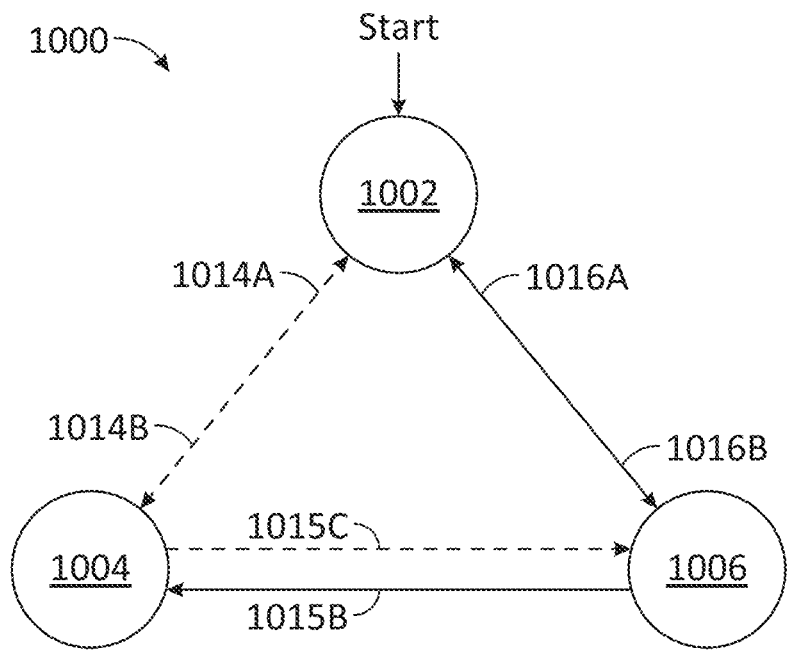
FIG. 10 illustrates a flow chart with steps to detect head/glasses position for setting a smart glass in sleep mode, according to some embodiments.

FIG. 10 illustrates a flow chart with steps to detect head/glasses position for setting a smart glass in sleep mode, according to some embodiments. When the system starts in a sleep mode 1002, it goes into manual mode when a manual command 1016A is activated. The system may revert to sleep mode 1002 by manual activation 1016A as well. When the system is in manual mode 1006, crossing the first or second threshold level with the ALS may trigger application of auto mode 1004. Likewise, when the system is in auto mode 1004, manual mode 1006 may be triggered by the user with a button, a touch sensor, or through a device assistant in the mobile device or application. In some embodiments, the smart glass may be turned into sleep mode 1002 from auto mode 1004, when the sensors detect that the smart glass is idle, or not in front of the user's face.

In some embodiments, when the system entered sleep mode 1002 from auto mode 1004, it returns to auto mode 1004 upon wake up. Likewise, when the system enters sleep mode 1002 from manual mode 1006, it may return to manual mode 1006 upon wake up.

Figure 11:
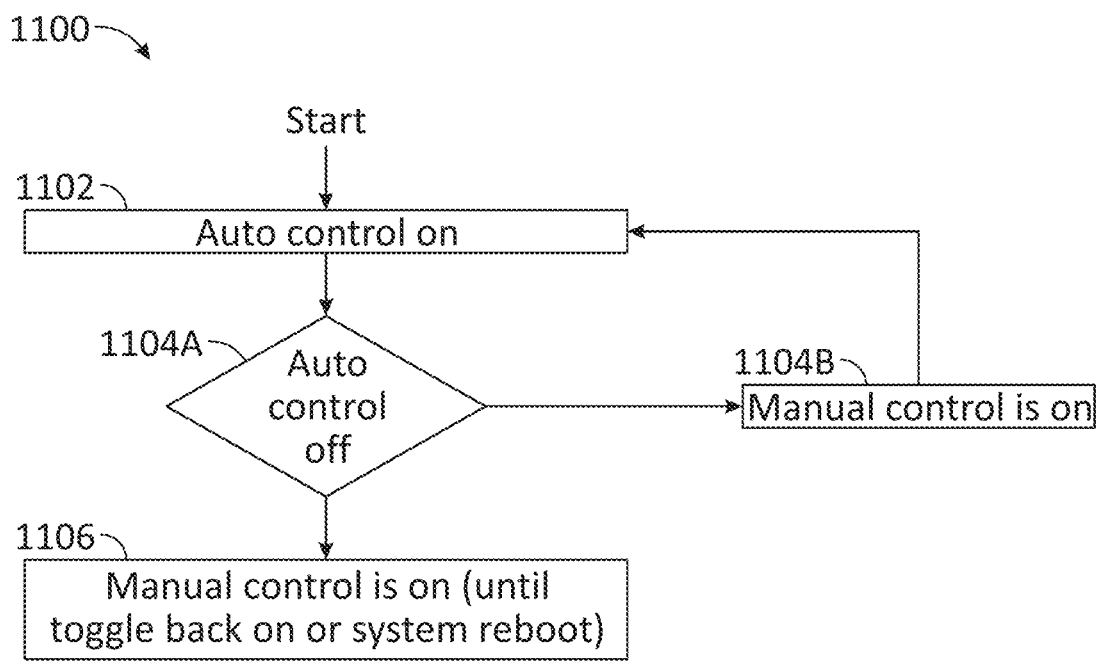
FIG. 11 illustrates a flow chart with steps for controlling a transparency level in a smart glass with a default automatic control mode, according to some embodiments.

FIG. 11 illustrates a flow chart 1100 with steps for controlling a transparency level in a smart glass with a default automatic control mode, according to some embodiments. Accordingly, the system starts with auto control mode 'on' (step 1102). When current ALS measurements fall outside any of the threshold levels established for the auto mode, the system switches to manual control (e.g., auto control is set 'off,' step 1104A). In some embodiments, when the system switches to manual control (step 1104B), it stays in manual control until it is toggled back to auto mode (e.g., by the user, via a button on the smart glass, or the assistant in the mobile application, in step 1106), the system is rebooted by the user, or the ALS sensor measures a value within pre-selected thresholds.

Figure 12:
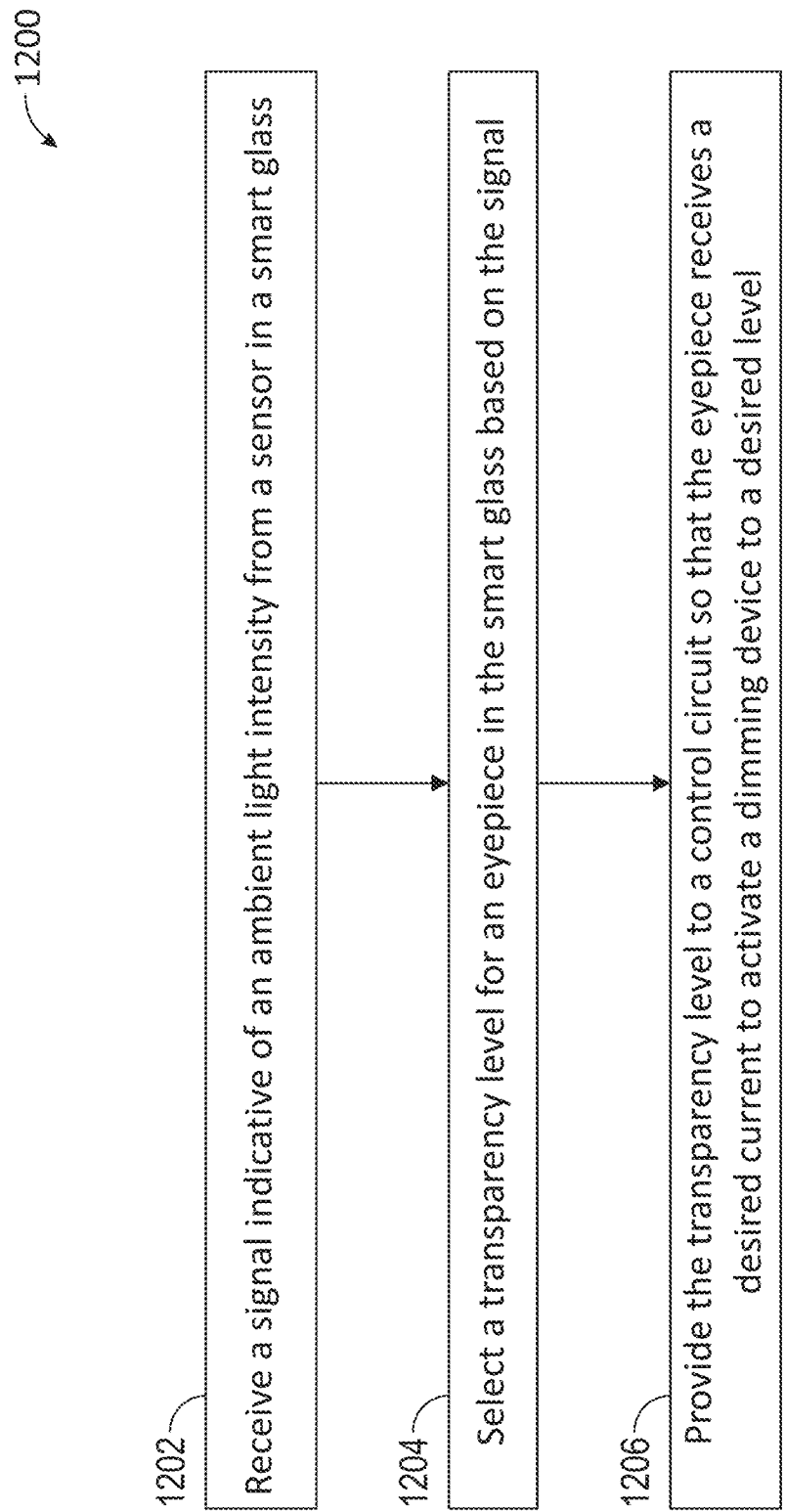
FIG. 12 illustrates a flow chart with steps in a method for controlling a transparency level in a smart glass, according to some embodiments.

FIG. 12 illustrates a flow chart with steps in a method 1200 for controlling a transparency level in a smart glass (e.g., smart glasses 100 and 200), according to some embodiments. At least some steps in method 1200 may be performed by a processor executing instructions stored in a memory (e.g., process 112 and memory 120). The processor and the memory may be part of the smart glass, or part of a mobile device communicatively coupled with the smart glass (e.g., mobile device 110). The mobile device may have an application installed therein, hosted by a remote server communicatively coupled to the mobile device via a network (e.g., server 130 and network 150). In some embodiments, sensors, microphones, speakers and cameras installed in the smart glass, as disclosed herein (e.g., ALS sensor 121, sensors 123, speaker 125, camera 122), may provide data and user commands to perform at least some of the operations in method 1200. Methods consistent with the present disclosure may include one or more steps from method 1200 performed in a different order, simultaneously, quasi-simultaneously, or overlapping in time.

Step 1202 includes receiving a signal indicative of an ambient light intensity from a sensor in a smart glass. In some embodiments, step 1202 further includes receiving a signal from a face detection system, the signal indicative that a user is wearing the smart glass, and booting the smart glass in response to the signal from the face detection system. In some embodiments, step 1202 further includes booting a computer in the smart glass upon receipt of a touch sensor signal from a user.

Step 1204 includes selecting a transparency level for an eyepiece in the smart glass based on the signal. In some embodiments, the signal indicative of a light intensity is an ultraviolet radiation level indicative that a user of the smart glass is outdoors during daytime, and step 1204 includes switching the smart glass from a clear mode of operation to a dark mode of operation. In some embodiments, the signal indicative of an ambient light intensity includes a partial signal indicative of an artificial illumination source, and a partial signal indicative of a dark background for the artificial illumination source, and step 1204 includes selecting a clear mode of operation. In some embodiments, step 1204 includes selecting from one of a clear mode, a mid-scale mode, and a dark mode of the smart glass. In some embodiments, the signal indicative of an ambient light intensity is higher than a pre-selected threshold, and step 1204 includes switching the smart glass from a sleep mode to a mid-scale mode. In some embodiments, the signal indicative of an ambient light intensity is higher than a pre-selected threshold, and step 1204 includes switching the smart glass from a clear mode to a dark mode. In some embodiments, the signal indicative of an ambient light intensity is higher than a first threshold and a second threshold, and step 1204 includes switching the smart glass from a clear mode to a dark mode. In some embodiments, step 1204 further includes receiving a sensing signal indicative that the smart glass is idle, and selecting a default transparency level in a sleep mode of the smart glass.

Step 1206 includes providing the transparency level to a control circuit so that the eyepiece can receive a desired current to activate a dimming device in the eyepiece to a desired level.

Figure 13:
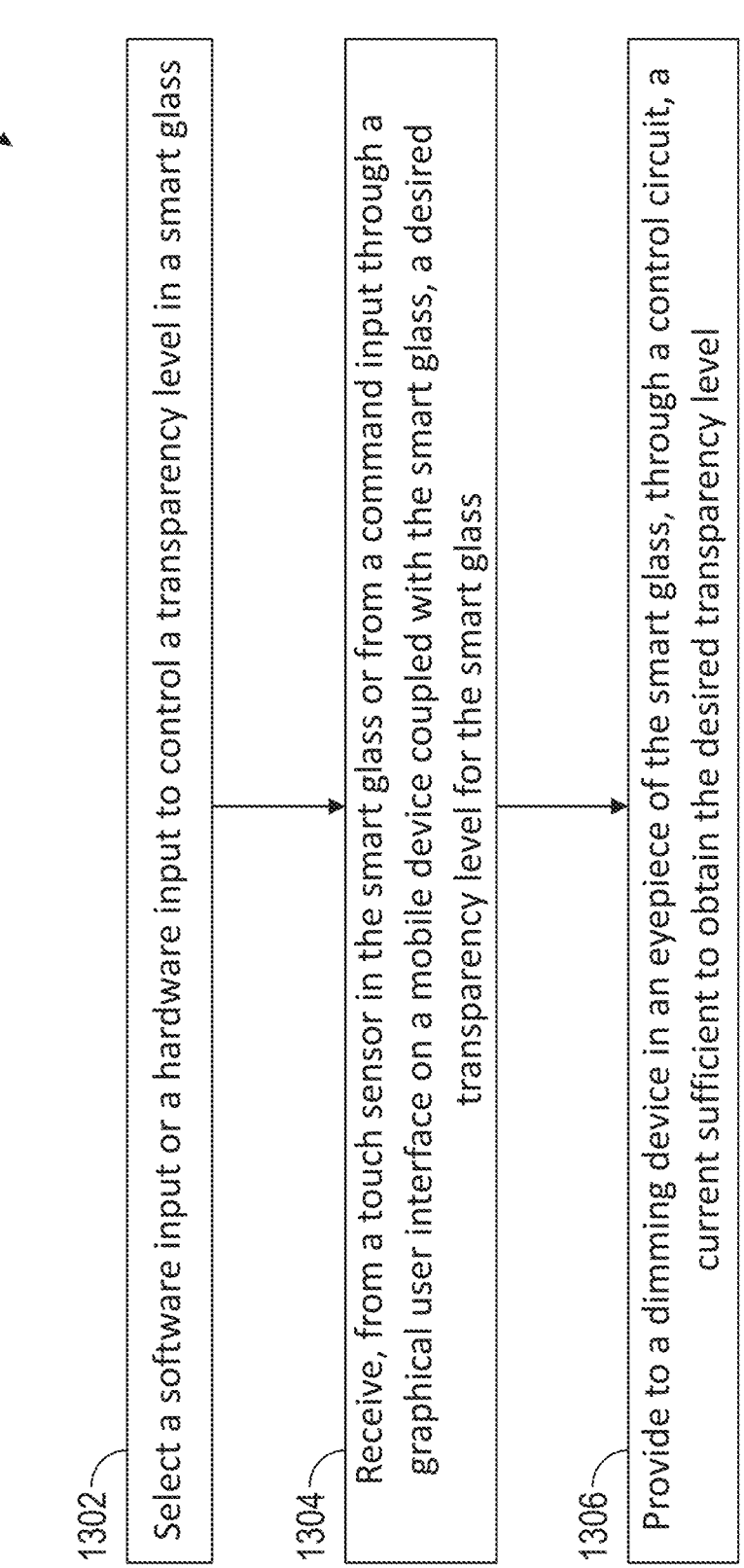
FIG. 13 illustrates a flow chart with steps in a method for controlling a transparency level in a smart glass via software or hardware, according to some embodiments.

FIG. 13 illustrates a flow chart with steps in a method for controlling a transparency level in a smart glass via software or hardware (e.g., smart glasses 100 and 200), according to some embodiments. At least some steps in method 1300 may be performed by a processor executing instructions stored in a memory (e.g., process 112 and memory 120). The processor and the memory may be part of the smart glass, or part of a mobile device communicatively coupled with the smart glass (e.g., mobile device 110). The mobile device may have an application installed therein, hosted by a remote server communicatively coupled to the mobile device via a network (e.g., server 130 and network 150). In some embodiments, sensors, microphones, speakers and cameras installed in the smart glass, as disclosed herein (e.g., ALS sensor 121, sensors 123, speaker 125, camera 122), may provide data and user commands to perform at least some of the operations in method 1300. Methods consistent with the present disclosure may include one or more steps from method 1300 performed in a different order, simultaneously, quasi-simultaneously, or overlapping in time.

Step 1302 includes selecting a software input or a hardware input to control a transparency level in a smart glass. In some embodiments, step 1302 further includes setting the smart glass in sleep mode when an idle signal is received from a sensor in the smart glass. In some embodiments, step 1302 further includes returning the smart glass to the software input or hardware input when the smart glass receives an awakening signal, based on a last mode of operation of the smart glass before going into a sleep mode.

Step 1304 includes receiving from a touch sensor in the smart glass or from a command input through a graphical user interface in a mobile device coupled with the smart glass, a desired transparency level for the smart glass. In some embodiments, step 1304 further includes receiving a measure of an ambient light intensity from a sensor in the smart glass and determining the desired transparency level for the smart glass when the software input is selected.

Step 1306 includes providing to a dimming device in an eyepiece of the smart glass, through a controller circuit, a current sufficient to obtain the desired transparency level. In some embodiments, step 1306 further includes assessing a smart glass configuration based on one of a user voice, a user gesture, and an environmental view from a scene captured from the smart glass.

Hardware Overview

Figure 14:
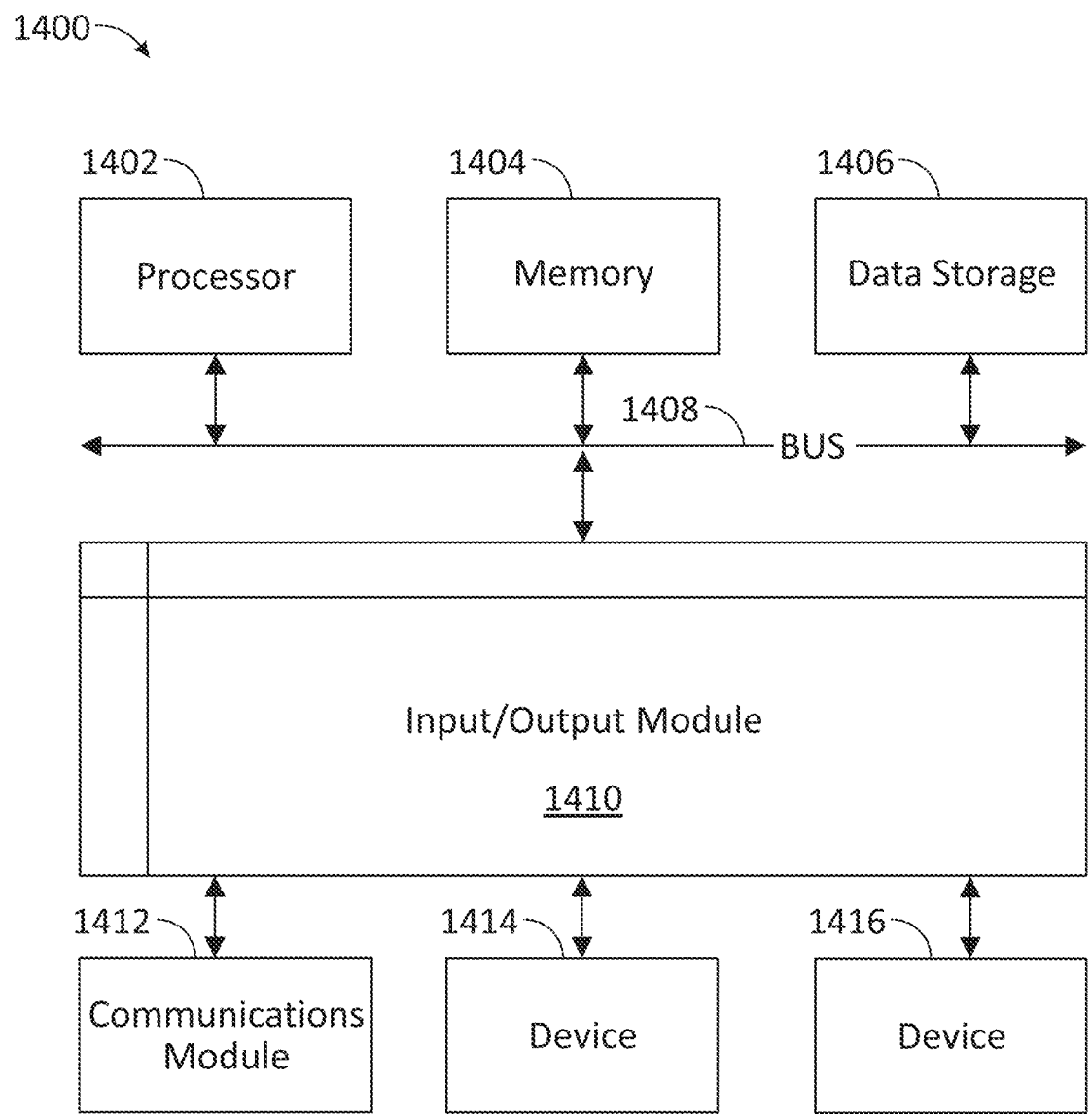
FIG. 14 is a block diagram illustrating an example computer system with which the smart glass of FIG. 1 and the flow charts of FIGS. 5-13 can be implemented.

FIG. 14 is a block diagram illustrating an example computer system with which the smart glass of FIG. 1 and the flow charts of FIGS. 5-13 can be implemented. In certain aspects, the computer system 1400 may be implemented using hardware or a combination of software and hardware, either in a dedicated server, or integrated into another entity, or distributed across multiple entities.

Computer system 1400 includes a bus 1408 or other communication mechanism for communicating information, and a processor 1402 coupled with bus 1408 for processing information. By way of example, the computer system 1400 may be implemented with one or more processors 1402. Processor 1402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a mode machine, gated logic, discrete hardware components, or any other suitable entity that can perform calculations or other manipulations of information.

Computer system 1400 can include, in addition to hardware, code that creates an execution environment for the computer program in question, e.g., code that constitutes processor firmware, a protocol stack, a database management system, an operating system, or a combination of one or more of them stored in an included memory 1404, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1408 for storing information and instructions to be executed by processor 1402. The processor 1402 and the memory 1404 can be supplemented by, or incorporated in, special purpose logic circuitry.

The instructions may be stored in the memory 1404 and implemented in one or more computer program products, e.g., one or more modules of computer program instructions encoded on a computer-readable medium for execution by, or to control the operation of, the computer system 1400, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1404 may also be used for storing temporary variable or other intermediate information during execution of instructions to be executed by processor 1402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1400 further includes a data storage device 1406 such as a magnetic disk or optical disk, coupled to bus 1408 for storing information and instructions. Computer system 1400 may be coupled via input/output module 1410 to various devices. Input/output module 1410 can be any input/output module. Exemplary input/output modules 1410 include data ports such as USB ports. The input/output module 1410 is configured to connect to a communications module 1412. Exemplary communications modules 1412 include networking interface cards, such as Ethernet cards and modems. In certain aspects, input/output module 1410 is configured to connect to a plurality of devices, such as an input device 1414 and/or an output device 1416. Exemplary input devices 1414 include a keyboard and a pointing device, e.g., a mouse or a trackball, by which a user can provide input to the computer system 1400. Other kinds of input devices 1414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1416 include display devices, such as an LCD (liquid crystal display) monitor, for displaying information to the user.

According to one aspect of the present disclosure, the client and server can be implemented using a computer system 1400 in response to processor 1402 executing one or more sequences of one or more instructions contained in memory 1404. Such instructions may be read into memory 1404 from another machine-readable medium, such as data storage device 1406. Execution of the sequences of instructions contained in main memory 1404 causes processor 1402 to perform the process steps described herein. One or more processors in a multi-processing arrangement may also be employed to execute the sequences of instructions contained in memory 1404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1400 can include clients and servers. A client and server are generally remote from each other and typically interact through a communication network. The relationship of client and server arises by virtue of computer programs running on the respective computers and having a client-server relationship to each other. Computer system 1400 can be, for example, and without limitation, a desktop computer, laptop computer, or tablet computer. Computer system 1400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1402 for execution. Such a medium may take many forms, including, but not limited to, non-volatile media, volatile media, and transmission media. Non-volatile media include, for example, optical or magnetic disks, such as data storage device 1406. Volatile media include dynamic memory, such as memory 1404. Transmission media include coaxial cables, copper wire, and fiber optics, including the wires forming bus 1408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
    receiving a signal indicative of an ambient light intensity from an ambient light sensor of smart glasses, wherein the signal comprises (i) a first signal indicative of an artificial illumination source and (ii) a second signal indicative of a dark background for the artificial illumination source;
    selecting a transparency level corresponding to a clear mode of operation for an eyepiece of the smart glasses based on the first and second signals; and
    providing the transparency level to the smart glasses so that the eyepiece can receive a desired current to activate a dimming device in the eyepiece to achieve the clear mode of operation.

2. The computer-implemented method of claim 1, further comprising:
    receiving a face-detection signal from a face-detection system, wherein the face-detection signal indicates that a user is wearing the smart glasses; and
    booting the smart glasses in response to receiving the face-detection signal.

3. The computer-implemented method of claim 1, further comprising:
    receiving a touch-sensor signal from a touch sensor, wherein the touch-sensor signal indicates that a user is touching the touch sensor;
    booting the smart glasses in response to receiving the touch-sensor signal.

4. The computer-implemented method of claim 1, further comprising:
    receiving another signal indicative of the ambient light intensity from the ambient light sensor, wherein the other signal comprises an ultraviolet radiation level indicating that a user of the smart glasses is outdoors during daytime;
    selecting, based on the other signal, the transparency level corresponding to a dark mode of operation for the eyepiece of the smart glasses; and
    providing the transparency level to the smart glasses so that the eyepiece can receive another desired current to activate the dimming device in the eyepiece to achieve the dark mode of operation.

5. The computer-implemented method of claim 1, further comprising:
    receiving another signal indicative of the ambient light intensity from the ambient light sensor;
    selecting, based on the other signal, the transparency level corresponding to a selected mode comprising one of the clear mode of operation, a mid-scale mode of operation, and a dark mode of operation; and
    providing the transparency level to the smart glasses so that the eyepiece can receive another desired current to activate the dimming device in the eyepiece to achieve the selected mode.

6. The computer-implemented method of claim 5, wherein:
    the signal indicative of the ambient light intensity is higher than a pre-selected threshold; and
    selecting the transparency level for the eyepiece of the smart glasses comprises switching the smart glasses from a sleep mode to the mid-scale mode of operation.

7. The computer-implemented method of claim 5, wherein:
    the signal indicative of the ambient light intensity is higher than a pre-selected threshold; and
    selecting the transparency level for the eyepiece of the smart glasses comprises switching the smart glasses from the clear mode of operation to the dark mode of operation.

8. The computer-implemented method of claim 5, wherein:
    the signal indicative of the ambient light intensity is higher than a first threshold and a second threshold; and
    selecting the transparency level for the eyepiece of the smart glasses comprises switching the smart glasses from the clear mode of operation to the dark mode of operation.

9. The computer-implemented method of claim 5, further comprising, responsive to receiving a sensing signal indicating that the smart glasses are idle:
    selecting, based on the sensing signal, a default transparency level for a sleep mode of the smart glasses; and
    providing the default transparency level to the smart glasses so that the eyepiece can receive another desired current to activate the dimming device in the eyepiece to achieve a default transparency mode of operation.

10. A system, comprising:
    a memory storing instructions; and
    one or more processors configured to execute the instructions and cause the system to perform operations comprising:
        receiving a signal indicative of an ambient light intensity from an ambient light sensor of smart glasses, wherein the signal comprises (i) a first signal indicative of an artificial illumination source and (ii) a second signal indicative of a dark background for the artificial illumination source;

selecting a transparency level corresponding to a clear mode of operation for an eyepiece of the smart glasses based on the first and second signals; and providing the transparency level to the smart glasses so that the eyepiece can receive a desired current to activate a dimming device in the eyepiece to achieve the clear mode of operation.

11. The system of claim 10, wherein the operations further comprise:

receiving (i) a face-detection signal from a face-detection system, wherein the face-detection signal indicates that a user is wearing the smart glasses or (ii) receiving a touch-sensor signal from a touch sensor, wherein the touch-sensor signal indicates that a user is touching the touch sensor;

booting the smart glasses in response to receiving the face-detection signal or the touch-sensor signal.

12. The system of claim 10, wherein the operations further comprise:

receiving another signal indicative of the ambient light intensity from the ambient light sensor, wherein the other signal comprises an ultraviolet radiation level indicating that a user of the smart glasses is outdoors during daytime;

selecting, based on the other signal, a transparency level corresponding to a dark mode of operation for the eyepiece of the smart glasses; and providing the transparency level to the smart glasses so that the eyepiece can receive another desired current to activate the dimming device in the eyepiece to achieve the dark mode of operation.

13. The system of claim 10, wherein the operations further comprise:

receiving another signal indicative of the ambient light intensity from the ambient light sensor;

selecting, based on the other signal, a transparency level corresponding to a selected mode comprising one of the clear mode of operation, a mid-scale mode of operation, and a dark mode of operation; and providing the transparency level to the smart glasses so that the eyepiece can receive another desired current to activate the dimming device in the eyepiece to achieve the selected mode.

14. A non-transitory, computer-readable medium storing instructions that, when executed by a processor of smart glasses, cause the smart glasses to perform operations comprising:

receiving a signal indicative of an ambient light intensity from an ambient light sensor of the smart glasses, wherein the signal comprises (i) a first signal indicative of an artificial illumination source and (ii) a second signal indicative of a dark background for the artificial illumination source;

selecting a transparency level corresponding to a clear mode of operation for an eyepiece of the smart glasses based on the first and second signals; and providing the transparency level to the smart glasses so that the eyepiece can receive a desired current to activate a dimming device in the eyepiece to achieve the clear mode of operation.

15. The non-transitory, computer-readable medium of claim 14, wherein the operations further comprise receiving another signal indicative of the ambient light intensity from the ambient light sensor, wherein the other signal comprises an ultraviolet radiation level indicating that a user of the smart glasses is outdoors during daytime;

selecting, based on the other signal, the transparency level corresponding to a dark mode of operation for the eyepiece of the smart glasses; and providing the transparency level to the smart glasses so that the eyepiece can receive another desired current to activate the dimming device in the eyepiece to achieve the dark mode of operation.

16. The non-transitory, computer-readable medium of claim 14, wherein the operations further comprise:

receiving another signal indicative of the ambient light intensity from the ambient light sensor, wherein the other signal comprises an ultraviolet radiation level indicating that a user of the smart glasses is outdoors during daytime;

selecting, based on the other signal, a transparency level corresponding to a dark mode of operation for the eyepiece of the smart glasses; and providing the transparency level to the smart glasses so that the eyepiece can receive another desired current to activate the dimming device in the eyepiece to achieve the dark mode of operation.

17. The non-transitory, computer-readable medium of claim 14, wherein the operations further comprise:

receiving another signal indicative of the ambient light intensity from the ambient light sensor;

selecting, based on the other signal, the transparency level corresponding to a selected mode comprising one of the clear mode of operation, a mid-scale mode of operation, and a dark mode of operation; and providing the transparency level to the smart glasses so that the eyepiece can receive another desired current to activate the dimming device in the eyepiece to achieve the selected mode.

18. The non-transitory, computer-readable medium of claim 14, wherein the operations further comprise, responsive to receiving a sensing signal indicating that the smart glasses are idle:

selecting, based on the sensing signal, a default transparency level for a sleep mode of the smart glasses; and providing the default transparency level to the smart glasses so that the eyepiece can receive another desired current to activate the dimming device in the eyepiece to achieve a default transparency mode of operation.

* * * * *